(12) United States Patent
Wang et al.

(10) Patent No.: US 11,847,086 B2
(45) Date of Patent: Dec. 19, 2023

(54) METHOD AND APPARATUS FOR CONFIGURING MMIOH BASE ADDRESS OF SERVER SYSTEM

(71) Applicant: SHANDONG YINGXIN COMPUTER TECHNOLOGIES CO., LTD., Shandong (CN)

(72) Inventors: Bing Wang, Shandong (CN); Huijuan Qian, Shandong (CN); Shaojun Yang, Shandong (CN); Fanyi Yao, Shandong (CN); Pengfang Luo, Shandong (CN); Daotong Li, Shandong (CN); Binghui Zhang, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/039,482

(22) PCT Filed: Apr. 22, 2022

(86) PCT No.: PCT/CN2022/088576
§ 371 (c)(1),
(2) Date: May 30, 2023

(87) PCT Pub. No.: WO2022/228315
PCT Pub. Date: Nov. 3, 2022

(65) Prior Publication Data
US 2023/0350834 A1  Nov. 2, 2023

(30) Foreign Application Priority Data
Apr. 26, 2021  (CN) .......................... 202110452757.4

(51) Int. Cl.
*G06F 13/42* (2006.01)
*G06F 9/4401* (2018.01)

(52) U.S. Cl.
CPC ........ *G06F 13/4234* (2013.01); *G06F 9/4401* (2013.01); *G06F 13/4221* (2013.01); *G06F 2213/0026* (2013.01); *G06F 2213/16* (2013.01)

(58) Field of Classification Search
CPC ............... G06F 13/4234; G06F 9/4401; G06F 13/4221; G06F 2213/0026; G06F 2213/16
See application file for complete search history.

(56) References Cited

U.S. PATENT DOCUMENTS 10,331,557 B1 *  6/2019  Karpagavinayagam .....................
G06F 13/4027
2015/0242330 A1  8/2015  Tsirkin et al.
(Continued)

FOREIGN PATENT DOCUMENTS

| CN | 101779196 A | 7/2010 |
| CN | 104809083 A | 7/2015 |

(Continued)

OTHER PUBLICATIONS

Corresponding International Patent Application No. PCT/CN2022/088576, International Search Report, dated Jul. 12, 2022.
(Continued)

*Primary Examiner* — Glenn A. Auve
(74) *Attorney, Agent, or Firm* — COOPER LEGAL GROUP, LLC (57) ABSTRACT

Please amend the abstract of the specification as follows: Disclosed is a method for configuring an MMIOH base address of a server system. The method includes: when the server system is performing a power-on self-test, detecting a total capacity of all memories in the server system, and determining a minimum MMIOH base address of the server system according to an MMIO specification and the total capacity; if a target MMIOH base address range corresponding to a target PCIE device configured in the server system might be calculated according to a whitelist, and the mini-
(Continued)

mum MMIOH base address is within the target MMIOH base address range, determining that the base address is the MMIOH base address of the server system, and storing the base address in a BIOS of the server system.

20 Claims, 2 Drawing Sheets

(56) References Cited

U.S. PATENT DOCUMENTS

2017/0262388 A1\* 9/2017 Lin ........................ G06F 9/4411
2017/0286149 A1 10/2017 Lu
2020/0327091 A1 10/2020 Tsuhishita et al.

FOREIGN PATENT DOCUMENTS

| CN | 105893289 A | 8/2016 |
| CN | 109656630 A | 4/2019 |
| CN | 111367764 A | 7/2020 |
| CN | 112000593 A | 11/2020 |
| CN | 113194161 A | 7/2021 |
| WO | 2017181853 A1 | 10/2017 |

OTHER PUBLICATIONS

Corresponding International Patent Application No. PCT/CN2022/088576, Written Opinion, dated Jul. 12, 2022.

\* cited by examiner

METHOD AND APPARATUS FOR CONFIGURING MMIOH BASE ADDRESS OF SERVER SYSTEM

CROSS-REFERENCE TO RELATED APPLICATION

This application is the national phase application of International Application No. PCT/CN2022/088576, filed Apr. 22, 2022, which claims priority to Chinese Patent Application No. 202110452757.4, filed on Apr. 26, 2021 in China National Intellectual Property Administration and entitled "METHOD AND APPARATUS FOR CONFIGURING MMIOH BASE ADDRESS OF SERVER SYSTEM". International Application No. PCT/CN2022/088576 and Chinese Patent Application No. 202110452757.4 are, hereby incorporated by reference in their entireties.

FIELD

The present application relates to the technical field of computers, and in particular, to a method, apparatus and device for configuring an MMIOH base address of a server system, and a medium.

BACKGROUND

Through the MMIO (Memory Mapping I/O) specification, peripheral devices of a server system might be mapped into the memory space of the server system, so that access to the peripheral devices by the CPU (Central Processing Unit) is more convenient. Therefore, the MMIO specification has been widely used in the technical field of servers.

Currently, when configuring an MMIOH (Memory Mapping I/O High, a high-end memory space for mapping information about the IO device to a memory address) base address of a server system, the server manufacturer will set a reasonable default MMIOH base address for the server system according to the configuration of the server in advance, so as to ensure the normal operation of the server system. When the memory of the server system is replaced, or the server system is replaced with a PCIE (Peripheral Component Interconnect Express) device having different requirements on MMIOH base address configuration, the MMIOH base address of the server system needs to be reset. In the related art, there are generally two methods to reset the MMIOH base address of the server system, namely, one is to manually enter a BIOS interface and use a tool or command to modify the MMIOH base address of the server system to an appropriate value, and the other is to modify the BIOS code to modify the MMIOH base address of the server system to an appropriate value. However, these two methods of setting the MMIOH base address of the server system are not only inefficient, but also prone to errors. There is no effective solution to this technical problem.

SUMMARY

In view of this, an object of the present application is to provide a method, apparatus and device for configuring an MMIOH base address of a server system, and a medium, so as to improve the efficiency and accuracy of configuring an MMIOH base address of a server system. The present application adopts the following specific solution.

A method for configuring an MMIOH base address of a server system includes the following steps:

when the server system is performing a power-on self-test, detecting a total capacity of all memories in the server system, and determining a minimum MMIOH base address of the server system according to an MMIO specification and the total capacity;

detecting PCIE devices configured in the server system to obtain a target PCIE device;

if a target MMIOH base address range corresponding to the target PCIE device might be calculated according to a whitelist, comparing the minimum MMIOH base address with the target MMIOH base address range; wherein the whitelist is a list configured according to the MMIO specification and PCIE devices having requirements on MMIOH base address configuration; and if the minimum MMIOH base address is within the target MMIOH base address range, determining that the minimum MMIOH base address is the MMIOH base address of the server system, and storing the minimum MMIOH base address in a BIOS of the server system.

In some embodiments, the method further includes:
writing the whitelist in the BIOS in advance.

In some embodiments, the method further includes:
if a target MMIOH base address range corresponding to the target PCIE device cannot be calculated according to the whitelist, prompting first pre-warning information, and setting the minimum MMIOH base address to be the MMIOH base address of the server system.

In some embodiments, the process of determining a minimum MMIOH base address of the server system according to an MMIO specification and the total capacity, includes:

determining a first calculated value of X+2 MB based on the MMIO specification, and rounding the first calculated value by 0.5 TB to obtain a second calculated value; wherein X is the total capacity, MB is a megabyte, and TB is a terabyte; and setting the second calculated value to be the minimum MMIOH base address of the server system.

In some embodiments, after the process of comparing the minimum MMIOH base address with the target MMIOH base address range, the method further includes:

if the minimum MMIOH base address is not within the target MMIOH base address range, prompting second pre-warning information, and setting the minimum MMIOH base address to be the MMIOH base address of the server system.

In some embodiments, the method further includes:
adjusting the target PCIE device according to the second pre-warning information.

Accordingly, the present application further discloses an apparatus for configuring an MMIOH base address of a server system. The apparatus includes:

a memory detection module, configured to, when the server system is performing a power-on self-test, detect a total capacity of all memories in the server system, and determine a minimum MMIOH base address of the server system according to an MMIO specification and the total capacity;

a device detection module, configured to detect PCIE devices configured in the server system to obtain a target PCIE device;

an address calculation module, configured to, if a target MMIOH base address range corresponding to the target PCIE device might be calculated according to a whitelist, compare the minimum MMIOH base address with the target MMIOH base address range; wherein the whitelist is a list configured according to the MMIO specification and PCIE devices having requirements on MMIOH base address configuration; and an address determination module, configured to, if the minimum MMIOH base address is within the target MMIOH base address range, determine that the minimum MMIOH base address is the MMIOH base address of the server system, and store the minimum MMIOH base address in a BIOS of the server system.

Accordingly, the present application further discloses a device for configuring an MMIOH base address of a server system. The device includes:

a memory, configured to store a computer program; and a processor, configured to implement the steps of the method for configuring an MMIOH base address of a server system as described above when executing the computer program.

Accordingly, the present application further discloses a computer-readable storage medium. The computer-readable storage medium has stored thereon a computer program which, when executed by a processor, implements the steps of the method for configuring an MMIOH base address of a server system as described above.

According to the present application, a whitelist is configured in advance according to an MMIO specification and PCIE devices having requirements for MMIOH base address configuration; when a server system is performing a power-on self-test, a total capacity of all memories in the server system are detected, and a minimum MMIOH base address of the server system is determined according to the MMIO specification and the total capacity of the physical memories of the server system; then, PCIE devices configured in the server system are detected to obtain a target PCIE device; if a target MMIOH base address range corresponding to the target PCIE device might be calculated according to the whitelist, the minimum MMIOH base address is compared with the target MMIOH base address range; and if the minimum MMIOH base address is within the target MMIOH base address range, the minimum MMIOH base address is determined to be the MMIOH base address of the server system, and the minimum MMIOH base address is stored in a BIOS of the server system. Obviously, compared with the prior art, since the described method might omit the tedious process of manually configuring the MMIOH base address of the server system, the efficiency and accuracy of configuring the MMIOH base address of the server system might thus be improved by means of the described method. Accordingly, the apparatus and device for configuring an MMIOH base address of a server system, and the medium provided in the present application also have the above-mentioned advantageous effects.

BRIEF DESCRIPTION OF THE DRAWINGS

In order to more clearly illustrate the technical solutions of embodiments of the present application and in the related art, a brief description will be given below with reference to the accompanying drawings which are required to be used in the description of the embodiments or related art. It is obvious that the drawings in the following description are only some embodiments of the present application, and it would have been obvious for a person skilled in the art to obtain other drawings according to the drawings provided without involving any inventive effort.

DETAILED DESCRIPTION

The embodiments of the present application will now be described more fully hereinafter with reference to the accompanying drawings, in which some, but not all embodiments of the application are shown. On the basis of the embodiments in the present application, all other embodiments obtained by a person skilled in the art without inventive effort fall within the scope of the present application.

Figure 1:
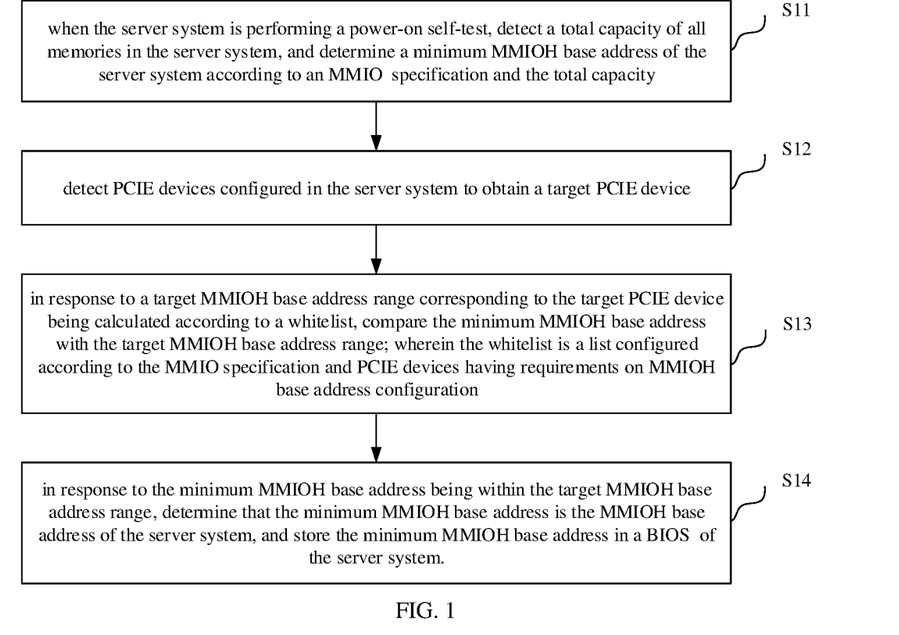
FIG. 1 is a flowchart of a method for configuring an MMIOH base address of a server system provided in an embodiment of the present application.

Referring to FIG. 1, FIG. 1 is a flowchart of a method for configuring an MMIOH base address of a server system provided in an embodiment of the present application. The method includes the following steps:

Step S11: when the server system is performing a power-on self-test, a total capacity of all memories in the server system is detected, and a minimum MMIOH base address of the server system is determined according to an MMIO specification and the total capacity;

Step S12: PCIE devices configured in the server system are detected to obtain a target PCIE device; Step S13: if a target MMIOH base address range corresponding to the target PCIE device might be calculated according to a whitelist, the minimum MMIOH base address is compared with the target MMIOH base address range;

wherein the whitelist is a list configured according to an MMIO specification and PCIE devices having requirements for MMIOH base address configuration; and Step S14: if the minimum MMIOH base address is within the target MMIOH base address range, the minimum MMIOH base address is determined to be the MMIOH base address of the server system, and the minimum MMIOH base address is stored in a BIOS of the server system.

In this embodiment, a method for configuring an MMIOH base address of a server system is provided, by which the efficiency and accuracy of configuring the MMIOH base address of the server system might be significantly improved.

It will be appreciated that, a part of PCIE devices such as GPU, network cards, and the like, in the server have certain requirements on MMIOH base address configuration, and the MMIOH base address of the server system cannot be set freely. Besides, according to the MMIO specification, there is a corresponding setting relationship between the MMIOH base address of the server system and the memory capacity of the server system. Therefore, in this embodiment, the whitelist needs to be configured in advance according to the special requirements on MMIOH base address configuration of PCIE devices in the MMIO specification and also PCIE devices having special requirements on MMIOH base address configuration, that is, PCIE devices having special requirements on MMIOH base address configuration of PCIE devices in the MMIO specification and PCIE devices having special requirements on MMIOH base address configuration are gathered into a whitelist in advance.

In some embodiments, in this embodiment, the MMIOH base address of the server system is firstly set according to the memory capacity of the server system, namely, when the server is performing a power-on self-test, the total capacity of all the physical memories in the server system is detected, and the minimum MMIOH base address of the server system is determined according to the MMIO specification and the total capacity of all the memories in the server system.

When the minimum MMIOH base address of the server system is determined, PCIE devices configured in the server system are detected to obtain a target PCIE device. It is to be noted that in this embodiment, the target PCIE device may be either all PCIE devices configured in the server system or PCIE devices in the server system which have special requirements on MMIOH base address configuration. Then, the target PCIE device is compared with a whitelist, and a target MMIOH base address range corresponding to the target PCIE device in the server system is calculated according to the whitelist.

If the target MMIOH base address range corresponding to the target PCIE device in the server system might be calculated according to the whitelist configured in advance, the minimum MMIOH base address is compared with the target MMIOH base address range to determine whether the minimum MMIOH base address conflicts with the target MMIOH base address range. Assuming that the minimum MMIOH base address is Y, and the target MMIOH base address range corresponding to the target PCIE device in the server system is (A, B), if the minimum MMIOH base address Y is within the target MMIOH base address range (A, B), it indicates that there is no conflict between the minimum MMIOH base address and the target MMIOH base address range, and in this case, the minimum MMIOH base address Y might be determined to be the MMIOH base address of the server system, and the minimum MMIOH base address Y is stored in the BIOS of the server system.

Compared with the prior art, with the method for configuring an MMIOH base address of a server system provided in the present embodiment, since the tedious process of manually configuring the MMIOH base address of the server system might be omitted, the method might be used to adaptively configure the MMIOH base address of the server system according to the memory capacity of the server system and the PCIE devices configured in the server system in different application scenarios. In this way, not only the manpower cost of the developer in the process of research and development, testing and production of the server might be greatly saved, but also the time required in the production of the server might be saved. At the same time, this method might also ensure the accuracy and reliability of the MMIOH base address of the server system in the process of configuration.

Furthermore, in the related art, if the BIOS code is modified to compile and generate a new BIOS version, the developer needs to redevelop a BIOS version every time the MMIOH base address of the server system is changed, which not only increases the development cost of the developer, but also increases the test cost and production cost of the server, and at the same time, confuses the BIOS code versions and increases the difficulty in managing the BIOS versions. According to the method for configuring an MMIOH base address of a server system provided in the present embodiment, since no redundant BIOS version is generated, the number of BIOS code versions and the difficulty in managing and controlling the BIOS code versions might be significantly reduced, and the production efficiency of the server might also be significantly improved.

In this embodiment, a whitelist is configured in advance according to an MMIO specification and PCIE devices having requirements for MMIOH base address configuration; when a server system is performing a power-on self-test, a total capacity of all memories in the server system are detected, and a minimum MMIOH base address of the server system is determined according to the MMIO specification and the total capacity of the physical memories of the server system; then, PCIE devices configured in the server system are detected to obtain a target PCIE device; if a target MMIOH base address range corresponding to the target PCIE device might be calculated according to the whitelist, the minimum MMIOH base address is compared with the target MMIOH base address range; and if the minimum MMIOH base address is within the target MMIOH base address range, the minimum MMIOH base address is determined to be the MMIOH base address of the server system, and the minimum MMIOH base address is stored in a BIOS of the server system. Obviously, compared with the prior art, since the described method might omit the tedious process of manually configuring the MMIOH base address of the server system, the efficiency and accuracy of configuring the MMIOH base address of the server system might thus be improved by means of the described method.

On the basis of the above-mentioned embodiment, this embodiment further describes and optimizes the technical solution, and in some embodiments, the above-mentioned method for configuring an MMIOH base address of a server system further includes the following step:

the whitelist is written in the BIOS in advance.

In practice, the collated whitelist may be written in advance into the BIOS of the server system. It is conceivable that when the whitelist is written into the BIOS of the server system, the tedious process of calling the whitelist from a remote server terminal might be omitted, and in this case, the server system might directly call the whitelist from the BIOS and calculate a target MMIOH base address range corresponding to a target PCIE device in the server system according to the whitelist.

Obviously, the technical solution provided by the present embodiment might further improve the speed and efficiency of configuring the MMIOH base address of the server system.

On the basis of the above-mentioned embodiment, this embodiment further describes and optimizes the technical solution, and in some embodiments, the above-mentioned method for configuring an MMIOH base address of a server system further includes the following step:

if a target MMIOH base address range corresponding to the target PCIE device cannot be calculated according to the whitelist, first pre-warning information is prompted, and the minimum MMIOH base address is set to be the MMIOH base address of the server system.

It will be appreciated that, in practice, it is also possible to encounter a situation where a target MMIOH base address range corresponding to a target PCIE device cannot be calculated from the whitelist. That is, MMIOH base addresses corresponding to different PCIE devices in the server system conflict, and in this case, a target MMIOH base address range corresponding to a target PCIE device cannot be calculated according to the whitelist.

When such situation occurs, in order to enable the operator to timely learn that the server system cannot calculate the target MMIOH base address range corresponding to the target PCIE device according to the whitelist, the server system prompts the first pre-warning information, and prints and displays the first pre-warning information in the BIOS for analysis and reference by the user. At the same time, the server system sets the minimum MMIOH base address calculated based on the maximum capacity of the physical memories of the server system to be the MMIOH base address of the server system.

Obviously, the technical solution provided by the present embodiment might ensure the comprehensiveness and completeness of the MMIOH base address of the server system provided by the present application in the process of configuration.

On the basis of the above-mentioned embodiments, this embodiment further describes and optimizes the technical solution, and in some embodiments, the step that a minimum MMIOH base address of the server system is determined according to an MMIO specification and the total capacity, includes:

a first calculated value of X+2 MB is determined based on the MMIO specification, and the first calculated value is rounded by 0.5 TB to obtain a second calculated value; where X is the total capacity, MB is a megabyte, and TB is a terabyte; and the second calculated value is set to be the minimum MMIOH base address of the server system.

It will be appreciated that, according to the MMIO specification, the MMIOH base address of the server system is greater than the total capacity of all the contents in the server system by more than 2 MB; therefore, in this embodiment, in order to enable the minimum MMIOH base address of the server system to satisfy the above-mentioned requirements, firstly, the first calculated value of X+2 MB is determined, then the first calculated value is rounded by 0.5 TB to obtain a second calculated value, and the second calculated value is set to be the minimum MMIOH base address of the server system.

For example: if a value obtained by calculating according to X+2 MB is 3.02 TB, then 3.02 TB is rounded by 0.5 TB to obtain 3.5 TB, that is, the minimum MMIOH base address of the server system would be set to be 3.5 TB; if the value calculated according to X+2 MB is 3.6 TB, then 3.6 TB is rounded by 0.5 TB to obtain 4 TB, that is, the minimum MMIOH base address of the server system would be set to be 4 TB.

It might be seen that the technical solution provided by the present embodiment might ensure the reliability of the minimum MMIOH base address of the server system during the process of configuration.

On the basis of the above-mentioned embodiments, this embodiment further describes and optimizes the technical solution, and in some embodiments, after the step that the minimum MMIOH base address is compared with the target MMIOH base address range, the method further includes:

if the minimum MMIOH base address is not within the target MMIOH base address range, second pre-warning information is prompted, and the minimum MMIOH base address is set to be the MMIOH base address of the server system.

If the minimum MMIOH base address Y of the server system is not within the target MMIOH base address range (A, B), that is, the minimum MMIOH base address Y is greater than the maximum MMIOH base address B in the target MMIOH base address range (A, B), or the minimum MMIOH base address Y is less than the minimum MMIOH base address A in the target MMIOH base address range (A, B), it indicates that the minimum MMIOH base address conflicts with the target MMIOH base address range, and the server system cannot determine the MMIOH base address.

In this case, the server system prompts the second pre-warning information, and prints and displays the second pre-warning information in the BIOS for analysis and reference by the user. At the same time, the server system sets the minimum MMIOH base address calculated based on the maximum capacity of the physical memories of the server system to be the MMIOH base address of the server system.

In some embodiments, the method for configuring an MMIOH base address of a server system further includes the following step:

the target PCIE device is adjusted according to the second pre-warning information.

It will be appreciated that since the second pre-warning information contains a specific reason why the server system cannot normally determine the MMIOH base address of the server system, in practical applications, when the operator obtains the second pre-warning information, the target PCIE device in the server system may be adjusted according to the second pre-warning information. That is, some of the PCIE devices in the server system are removed or some of the PCIE devices in the server system are replaced with other types of PCIE devices according to the second pre-warning information. Base on the same principle, the operator may also adjust the target PCIE device in the server system according to the information content contained in the first pre-warning information, which will not be described in detail herein.

Obviously, with the technical solution provided by the present embodiment, the security of the server system during subsequent use might be relatively guaranteed.

Figure 2:
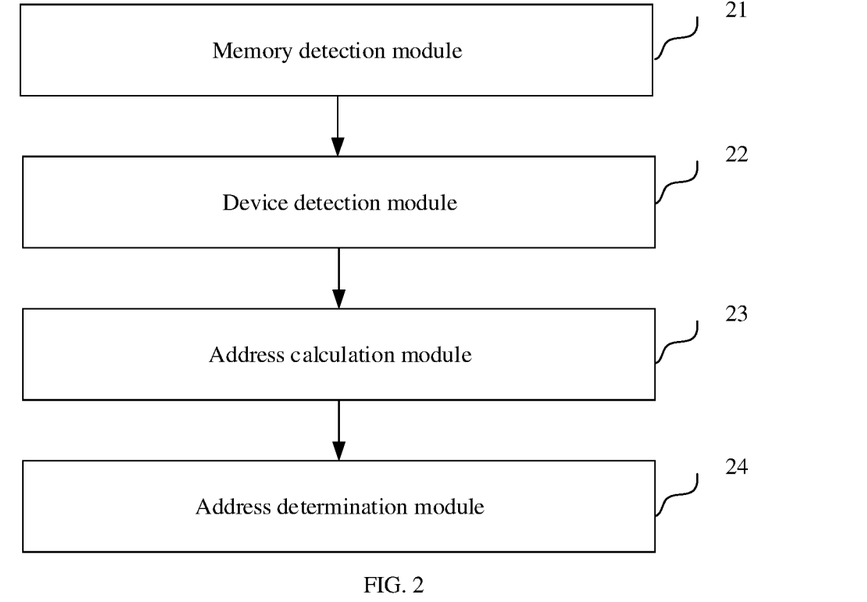
FIG. 2 is a schematic diagram showing the structure of an apparatus for configuring an MMIOH base address of a server system provided in an embodiment of the present application.

Referring to FIG. 2, FIG. 2 is a schematic diagram showing the structure of an apparatus for configuring an MMIOH base address of a server system provided in an embodiment of the present application. The apparatus includes:

a memory detection module 21, configured to, when the server system is performing a power-on self-test, detect a total capacity of all memories in the server system, and determine a minimum MMIOH base address of the server system according to an MMIO specification and the total capacity;

a device detection module 22, configured to detect PCIE devices configured in the server system to obtain a target PCIE device;

an address calculation module 23, configured to, if a target MMIOH base address range corresponding to the target PCIE device might be calculated according to a whitelist, compare the minimum MMIOH base address with the target MMIOH base address range; where the whitelist is a list configured according to the MMIO specification and PCIE devices having requirements on MMIOH base address configuration; and an address determination module 24, configured to, if the minimum MMIOH base address is within the target MMIOH base address range, determine that the minimum MMIOH base address is the MMIOH base address of the server system, and store the minimum MMIOH base address in a BIOS of the server system.

The apparatus for configuring an MMIOH base address of a server system provided by the embodiment of the present application has the beneficial effects of the method for configuring an MMIOH base address of a server system as described above.

Figure 3:
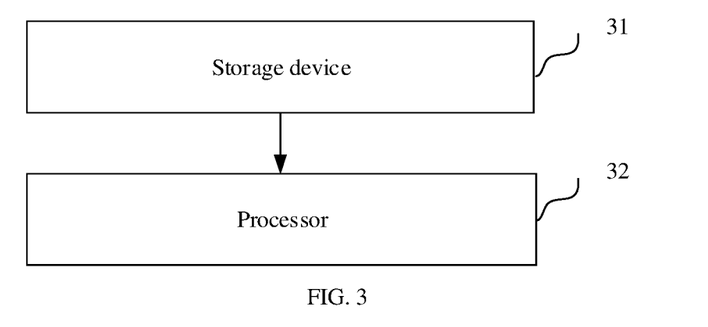
FIG. 3 is a schematic diagram showing the structure of a device for configuring an MMIOH base address of a server system provided in an embodiment of the present application.

Referring to FIG. 3, FIG. 3 is a schematic diagram showing the structure of a device for configuring an MMIOH base address of a server system provided in an embodiment of the present application. The device includes:

a storage device 31, configured to store a computer program; and a processor 32, configured to implement the steps of the method for configuring an MMIOH base address of a server system as described above when executing the computer program.

The device for configuring an MMIOH base address of a server system provided by the embodiment of the present application has the beneficial effects of the method for configuring an MMIOH base address of a server system as described above.

Accordingly, an embodiment of the present application further provides a computer-readable storage medium. The computer-readable storage medium has stored thereon a computer program which, when executed by a processor, implements the steps of the method for configuring an MMIOH base address of a server system as described above.

The computer-readable storage medium provided by the embodiment of the present application has the beneficial effects of the method for configuring an MMIOH base address of a server system as described above.

In this specification, various embodiments are described in a progressive manner, each of which focuses on a departure from the other embodiments, and reference is made to the same or similar parts throughout the various embodiments. The apparatus disclosed in the embodiments is relatively simple to describe, since it corresponds to the method disclosed in the embodiments, with reference to the description in the method section.

Finally, it is also noted that the use of relational terms such as first and second, and the like herein, are used solely to distinguish one entity or action from another entity or action without necessarily requiring or implying any actual such relationship or order between such entities or actions. Furthermore, the terms "comprise", "include", or any other variation thereof, are intended to cover a non-exclusive inclusion, such that a process, method, article, or device that comprises a list of elements does not include only those elements but may include other elements not expressly listed or inherent to such process, method, article, or device. An element proceeded by "comprises a . . . " does not, without more constraints, preclude the existence of additional identical elements in the process, method, article, or device that comprises the element.

The method, apparatus and device for configuring an MMIOH base address of a server system, and the medium, provided in the present application are described in detail above, and the principles and embodiments of the present application are described herein using specific examples. The description of the above examples is only for helping to understand the method and the core idea of the present application. Meanwhile, for a person skilled in the art, according to the idea of the present application, there may be changes in the specific embodiments and the application scope, and in summary, the contents of the present description should not be construed as limiting the present application.

What is claimed is:

1. A method for configuring an MMIOH (Memory Mapping I/O High) base address of a server system comprising:
when the server system is performing a power-on self-test, detecting a total capacity of all memories in the server system, and determining a minimum MMIOH base address of the server system according to an MMIO (Memory Mapping I/O) specification and the total capacity;
detecting PCIE (Peripheral Component Interconnect Express) devices configured in the server system to obtain a target PCIE device;
in response to a target MMIOH base address range corresponding to the target PCIE device being calculated according to a whitelist, comparing the minimum MMIOH base address with the target MMIOH base address range; wherein the whitelist is a list configured according to the MMIO specification and PCIE devices having requirements on MMIOH base address configuration; and
in response to the minimum MMIOH base address being within the target MMIOH base address range, determining that the minimum MMIOH base address is the MMIOH base address of the server system, and storing the minimum MMIOH base address in a BIOS (Basic Input Output System) of the server system.

2. The method according to claim 1, further comprising: writing the whitelist in the BIOS in advance.

3. The method according to claim 2, wherein, after the comparing the minimum MMIOH base address with the target MMIOH base address range, the method further comprises:
in response to the minimum MMIOH base address being not within the target MMIOH base address range, prompting second pre-warning information, and setting the minimum MMIOH base address to be the MMIOH base address of the server system.

4. The method according to claim 1, further comprising:
in response to the target MMIOH base address range corresponding to the target PCIE device being not calculated according to the whitelist, prompting first pre-warning information, and setting the minimum MMIOH base address to be the MMIOH base address of the server system.

5. The method according to claim 4, wherein, after the comparing the minimum MMIOH base address with the target MMIOH base address range, the method further comprises:
in response to the minimum MMIOH base address being not within the target MMIOH base address range, prompting second pre-warning information, and setting the minimum MMIOH base address to be the MMIOH base address of the server system.

6. The method according to claim 1, wherein the determining a minimum MMIOH base address of the server system according to an MMIO specification and the total capacity, comprises:
determining a first calculated value of X+2 MB based on the MMIO specification, and rounding the first calculated value by 0.5 TB to obtain a second calculated value; wherein X is the total capacity, MB is a megabyte, and TB is a terabyte; and
setting the second calculated value to be the minimum MMIOH base address of the server system.

7. The method according to claim 6, wherein, after the comparing the minimum MMIOH base address with the target MMIOH base address range, the method further comprises:
in response to the minimum MMIOH base address being not within the target MMIOH base address range, prompting second pre-warning information, and setting the minimum MMIOH base address to be the MMIOH base address of the server system.

8. The method according to claim 1, wherein, after the comparing the minimum MMIOH base address with the target MMIOH base address range, the method further comprises:
in response to the minimum MMIOH base address being not within the target MMIOH base address range, prompting second pre-warning information, and setting the minimum MMIOH base address to be the MMIOH base address of the server system.

9. The method according to claim 8, further comprising: adjusting the target PCIE device according to the second pre-warning information.

10. The method according to claim 9, wherein the adjusting the target PCIE device according to the second pre-warning information, comprises:
removing some of the PCIE devices in the server system according to the second pre-warning information, or
replacing some of the PCIE devices in the server system with other types of PCIE devices according to the second pre-warning information.

11. A device for configuring an MMIOH (Memory Mapping I/O High) base address of a server system, comprising:
a storage device storing a computer program; and
a processor, configured to execute the computer program, wherein upon execution of the computer program, the processor is configured to:
when the server system is performing a power-on self-test, detect a total capacity of all memories in the server system, and determine a minimum MMIOH base address of the server system according to an MMIO (Memory Mapping I/O) specification and the total capacity;
detect PCIE (Peripheral Component Interconnect Express) devices configured in the server system to obtain a target PCIE device;
in response to a target MMIOH base address range corresponding to the target PCIE device being calculated according to a whitelist, compare the minimum MMIOH base address with the target MMIOH base address range; wherein the whitelist is a list configured according to the MMIO specification and PCIE devices having requirements on MMIOH base address configuration; and
in response to the minimum MMIOH base address being within the target MMIOH base address range, determine that the minimum MMIOH base address is the MMIOH base address of the server system, and store the minimum MMIOH base address in a BIOS (Basic Input Output System) of the server system.

12. The device according to claim 11, wherein the processor, upon execution of the computer program, is further configured to:
write the whitelist in the BIOS in advance.

13. The device according to claim 11, wherein the processor, upon execution of the computer program, is further configured to:
in response to the target MMIOH base address range corresponding to the target PCIE device being not calculated according to the whitelist, prompt first pre-warning information, and set the minimum MMIOH base address to be the MMIOH base address of the server system.

14. The device according to claim 11, wherein in order to determine the minimum MMIOH base address of the server system according to the MMIO specification and the total capacity, the processor, upon execution of the computer program, is configured to:
determine a first calculated value of X+2 MB based on the MMIO specification, and round the first calculated value by 0.5 TB to obtain a second calculated value; wherein X is the total capacity, MB is a megabyte, and TB is a terabyte; and set the second calculated value to be the minimum MMIOH base address of the server system.

15. The device according to claim 11, wherein the processor, upon execution of the computer program, is further configured to:
in response to the minimum MMIOH base address being not within the target MMIOH base address range, prompt second pre-warning information, and set the minimum MMIOH base address to be the MMIOH base address of the server system.

16. The device according to claim 15, wherein the processor, upon execution of the computer program, is further configured to:
adjust the target PCIE device according to the second pre-warning information.

17. A non-transitory computer-readable storage medium, storing a computer program executable by a processor, wherein upon execution by the processor, the computer program is configured to cause the processor to:
when a server system is performing a power-on self-test, detect a total capacity of all memories in the server system, and determine a minimum MMIOH (Memory Mapping I/O High) base address of the server system according to an MMIO (Memory Mapping I/O) specification and the total capacity;
detect PCIE (Peripheral Component Interconnect Express) devices configured in the server system to obtain a target PCIE device;
in response to a target MMIOH base address range corresponding to the target PCIE device being calculated according to a whitelist, compare the minimum MMIOH base address with the target MMIOH base address range; wherein the whitelist is a list configured according to the MMIO specification and PCIE devices having requirements on MMIOH base address configuration; and
in response to the minimum MMIOH base address being within the target MMIOH base address range, determine that the minimum MMIOH base address is an MMIOH base address of the server system, and store the minimum MMIOH base address in a BIOS (Basic Input Output System) of the server system.

18. The non-transitory computer-readable storage medium according to claim 17, wherein the processor, upon execution of the computer program, is further configured to:
write the whitelist in the BIOS in advance.

19. The non-transitory computer-readable storage medium according to claim 17, wherein the processor, upon execution of the computer program, is further configured to:
in response to the target MMIOH base address range corresponding to the target PCIE device being not calculated according to the whitelist, prompt first pre-warning information, and set the minimum MMIOH base address to be the MMIOH base address of the server system.

20. The non-transitory computer-readable storage medium according to claim 17, wherein in order to determine the minimum MMIOH base address of the server system according to the MMIO specification and the total capacity, the processor, upon execution of the computer program, is configured to:
determine a first calculated value of X+2 MB based on the MMIO specification, and round the first calculated value by 0.5 TB to obtain a second calculated value; wherein X is the total capacity, MB is a megabyte, and TB is a terabyte; and set the second calculated value to be the minimum MMIOH base address of the server system.

* * * * *